Sept. 12, 1933.  T. F. KRUMM  1,926,487
COUPLING
Filed April 28, 1932
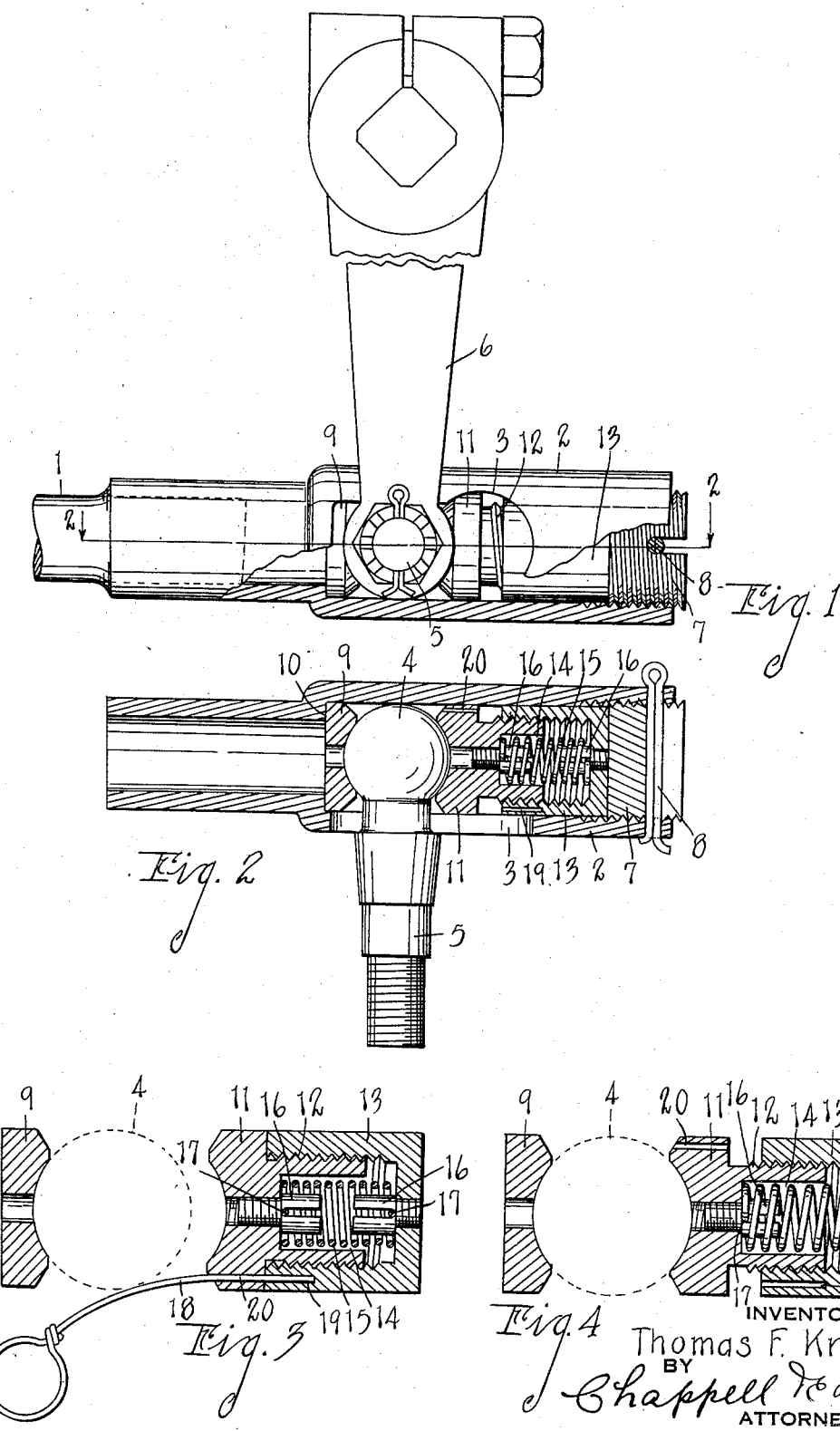

Patented Sept. 12, 1933

1,926,487

UNITED STATES PATENT OFFICE 1,926,487

COUPLING

Thomas F. Krumm, Toledo, Ohio, assignor of one-third to Hugh F. Mehaffie, Kalamazoo, Mich., and one-third to Stewart S. McClelland, Detroit, Mich.

Application April 28, 1932. Serial No. 607,910

4 Claims. (Cl. 287—90)

The main objects of this invention are:

First, to provide an improved coupling for connecting rods, drag links, shock absorbers and the like which is capable of sustaining heavy loads and at the same time is noiseless and automatically compensates for wear.

Second, to provide a coupling which is well adapted for the purposes indicated in which the parts are very economical to produce and easily assembled.

Third, to provide a take-up for couplings which may be readily embodied in or adapted to structures now extensively used.

Objects pertaining to details and economies of my invention will definitely appear from the description to follow. The invention is defined in the claims.

A structure embodying the features of my invention is clearly illustrated in the accompanying drawing, in which:

Fig. 1 is a fragmentary view of a drag link embodying the features of my invention, parts being shown in longitudinal section.

Fig. 2 is a fragmentary view mainly in longitudinal section on line 2—2 of Fig. 1.

Fig. 3 is a longitudinal section of certain parts disassembled from the coupling head illustrating structure and method of manipulation.

Fig. 4 is a sectional view of parts shown in Fig. 3 in operative relation.

In the embodiment of my invention illustrated in the accompanying drawing 1 represents a link or connecting rod provided with a tubular coupling head 2. This coupling head has a key-hole slot 3 in the side thereof adapted to receive the ball 4 of the coupling member 5. 6 represents the part to be actuated, the stem of the coupling member 5 being secured thereto.

The head 2 is provided with a plug 7 threaded into the head and retained by a pin 8. The inner bearing member 9 is seated on a shoulder 10 at the inner end of the head. The outer or thrust bearing 11 is provided with a threaded shank 12 loosely threaded into the plug-like support 13 arranged within the coupling head 2 and adjustably supported by the plug 7. The shank 12 has a recess 14 at its inner end receiving one end of the spring 15. Slotted fillister-headed screws 16 are threaded into the support 13 and the shank 12 in opposed relation, the spring 15 being provided with laterally turned ends 17 engaged in these slots so that when the shank 13 is screwed into the support tension is applied to the spring. The spring acts to rotate the member 11 and thus urges it against the ball 4. However, the shock and load on the joint are sustained by the threads, that is, the thrust is not upon the spring but is upon the threads so that a comparatively light spring is all that is required to keep a perfect fit, both in the matter of automatic adjustment when the parts are assembled and also to compensate for wear.

To facilitate assembling the shank is threaded into the support as shown in Fig. 3 and locked in the retracted position shown therein by means of the pin 18 engaging holes 19 and 20 in the support and thrust member, respectively, when these openings are brought into alinement as shown in Fig. 3. The pin, however, may be readily withdrawn, which frees the thrust member so that it is rotated by the spring, and, owing to its threaded engagement with the support is advanced into proper bearing engagement with the ball member. The load is not upon the spring, and the spring and threads are housed so that they are not likely to become damaged or inoperative in use.

I have illustrated and described my improvements as I have embodied them for drag links and the like. I have not attempted to show other adaptations or embodiments as it is believed that this disclosure will enable those skilled in the art to embody or adapt my improvements as may be desired.

Having thus described my invention what I claim as new and desire to secure by Letters Patent is:

1. A ball joint thrust bearing comprising a thrust bearing member having a tubular externally threaded shank of reduced diameter, a cup-like support for said bearing member having a bore into which said shank is loosely threaded, the bearing member and the support being of substantially the same external diameter, said shank and said support having opposed slotted central studs threaded therein, and a coiled spring having its ends engaged in the slots of said studs whereby potential turning torque may be stored in the spring by screwing the shank into the support, said thrust bearing member and support having longitudinal pin holes adapted for alinement to receive a pin to prevent relative rotation of the parts during assembly.

2. A ball joint thrust bearing comprising a thrust bearing member having a threaded tubular shank, a cup-like support for said bearing member having a bore into which said shank is loosely threaded, said shank and said support having opposed slotted studs threaded therein, and a coiled spring having its ends engaged in the slots of said studs whereby potential turning torque may be stored in the spring by screwing the shank into the support, the bearing member and support being of substantially the same external diameter and forming a plunger-like unit with a smooth outer surface.

3. A ball joint thrust bearing comprising a bearing member having a threaded tubular shank, a cup-like support for said bearing member loosely threaded on said shank, the bearing member and its support forming a self-enclosed plunger-like unit of substantially constant diameter, fillister headed screws threaded to said bearing member and support in opposed relation, and a torsion spring provided with laterally turned ends terminating in the fillister heads of said screws, the screws being held in place by the torsional force of said spring.

4. A ball joint thrust bearing comprising a bearing member having a threaded tubular shank, a cup-like support for said bearing member loosely threaded on said shank, the bearing member and its support forming a self-enclosed plunger-like unit, fillister headed screws threaded to said bearing member and support in opposed relation, and a torsion spring provided with laterally turned ends terminating in the fillister heads of said screws.

THOMAS F. KRUMM.